(12) United States Patent
Albertie (10) Patent No.: US 10,803,519 B1
(45) Date of Patent: Oct. 13, 2020

(54) SYSTEMS AND METHODS FOR LOCATING FUNDING OPPORTUNITIES

(71) Applicant: Capital One Services, LLC, McLean, VA (US)

(72) Inventor: Nicole Albertie, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/505,285

(22) Filed: Jul. 8, 2019

(51) Int. Cl.
*G06Q 40/00* (2012.01)
*G06Q 40/02* (2012.01)
*G06Q 40/06* (2012.01)
*G06K 9/62* (2006.01)
*G06Q 30/02* (2012.01)
*G06F 16/9532* (2019.01)

(52) U.S. Cl.
CPC ....... *G06Q 40/025* (2013.01); *G06F 16/9532* (2019.01); *G06K 9/6263* (2013.01); *G06Q 30/0201* (2013.01); *G06Q 30/0203* (2013.01); *G06Q 40/06* (2013.01)

(58) Field of Classification Search
USPC ............ 705/38, 37, 39, 40, 26, 41; 707/780, 707/766, 760, 758; 704/215; 709/201; 235/383, 379, 380
See application file for complete search history.

(56) References Cited

U.S. PATENT DOCUMENTS

| | | | |
|---|---|---|---|
| 6,012,043 A * | 1/2000 | Albright | G06Q 40/00 705/35 |
| 6,253,192 B1 * | 6/2001 | Corlett | G06Q 40/00 705/35 |
| 7,155,510 B1 * | 12/2006 | Kaplan | G06Q 30/0202 709/224 |
| 7,216,099 B2 * | 5/2007 | Chen | G06Q 40/00 705/35 |

(Continued)

OTHER PUBLICATIONS

Capitalizing on multiple market opportunities; K. Dakin; Nov. 9, 1995; IEEE Software (vol. 12, Issue: 5, pp. 84-86). (Year: 1995).*

(Continued)

*Primary Examiner* — Tien C Nguyen
(74) *Attorney, Agent, or Firm* — Pillsbury Winthrop Shaw Pittman LLP (57) ABSTRACT

A system for locating funding opportunities is disclosed. The system may include at least one memory for storing instructions and at least one processor configured to execute the instructions to perform operations. The operations include receiving answers to queries presented to a user at an electronic interface, the answers comprising financial information; predicting, based on the financial information, a funding opportunity and a success rate for establishing a business, the funding opportunity and the success rate being determined based on a plurality of supervised learning techniques; searching the Internet to identify data relating to real-time funding announcements; comparing the data to the funding opportunity and the success rate; assigning a ranking value to the funding opportunity, the ranking value being based on the data comparison and being associated with a plurality of rules; and calculating, based on the rules, an estimated timeline for financing the funding opportunity.

23 Claims, 9 Drawing Sheets

(56) References Cited

U.S. PATENT DOCUMENTS

| | | | | |
|---|---|---|---|---|
| 7,373,329 B2* | 5/2008 | Gallagher | ......... | G06Q 20/0855 |
| | | | | 705/39 |
| 7,577,597 B1* | 8/2009 | Allison | ............... | G06Q 20/102 |
| | | | | 235/379 |
| 7,765,138 B2* | 7/2010 | Loeper | ................... | G06Q 40/00 |
| | | | | 705/35 |
| 7,801,787 B2* | 9/2010 | Jain | ....................... | G06Q 40/06 |
| | | | | 705/35 |
| 8,224,728 B2* | 7/2012 | Arena | ................... | G06Q 40/00 |
| | | | | 705/35 |
| 8,326,728 B1* | 12/2012 | Devaney | ............... | G06Q 40/08 |
| | | | | 705/35 |
| 8,364,713 B2* | 1/2013 | Pollard | ............... | G06F 21/6245 |
| | | | | 707/784 |
| 8,650,108 B1* | 2/2014 | Schram | ............... | G06Q 10/063 |
| | | | | 705/36 R |
| 8,756,136 B2* | 6/2014 | Freund | ................... | G06Q 20/00 |
| | | | | 705/35 |
| 10,284,567 B2* | 5/2019 | Todasco | ............... | H04L 63/123 |
| 2006/0010053 A1* | 1/2006 | Farrow | ................. | G06Q 40/00 |
| | | | | 705/35 |
| 2009/0319439 A1* | 12/2009 | Jain | ....................... | G06Q 40/06 |
| | | | | 705/36 R |

OTHER PUBLICATIONS

Archiving and Distributing Three Long-Term Interconnected Geospatial Data Sets; M.S. Moran, B.S. Hutchinson, S.E. Marsh, M.P. McClaran;Jul. 2, 2012; IEEE Transactions on Geoscience and Remote Sensing (vol. 47, Issue: 1, pp. 59-71). (Year: 2012).*

* cited by examiner

Sample Questions

LLC or Sole Proprietor?
How much working capital do you currently have?
How much debt do you have?
How much funding do you need?
What type of business?
Minority or Woman owned?

Sample Results

8 - You qualify for eight federal grants

2 - Two venture capital firms in your area have recently invested in your industry

3 - Three years is the predicted amount of years to secure the $280,000 you need. Here are tips that can help.

5 - There are five upcoming pitch competitions in your area that you need to know about.

Financial Loophole Locator
A simple tool to help entrepreneurs secure funding and reach their financial goals.

Right Questions = Effective Solutions
Using simple questions and enhanced search capabilities, this tool delivers detailed and relevant results tailored specifically to the user.

Evaluate. Search. Rank. Predict.
The user answers questions about their business. The tool then searches public records, federal databases, news, angel investor networks, COF data, and predictive models to provide a comprehensive blueprint/plan for action.

SYSTEMS AND METHODS FOR LOCATING FUNDING OPPORTUNITIES

TECHNICAL FIELD

The present disclosure relates generally to computer systems and machine learning for use in locating funding opportunities, and more particularly to an improved system and method for searching and scraping online information in order to evaluate, search, rank, and predict funding opportunities, timeliness, and business success rates.

BACKGROUND

Searching for ways to fund a business can be challenging and extremely time consuming. Entrepreneurs currently experience difficulty in locating funding opportunities in order reach their business and financial goals. Information is either not public or accessible, or where it is available, it is segregated or disaggregated and difficult to find. Moreover, once funding information is located, it is difficult for entrepreneurs to assess the validity, reliability, and applicability of the gleaned information relative to their business and financial goals.

Therefore, what is needed is a dynamic and reliable solution for entrepreneurs looking to locate funding opportunities in real-time. Similar to searching for scholarships, what is needed is an online and electronic tool that uses public databases, historical data, and machine learning to provide simple action plans and projected timelines for reaching financial goals. What is needed is an online and electronic tool that provides a custom funding journey and startup success rate, includes search of real-time funding mentions, a business ranking, funding and content recommendations, and timing predictions with a custom timeline to reach financial goals.

The disclosed online system for locating funding opportunities may address one or more of the problems set forth above and/or other problems in the prior art.

SUMMARY

One aspect of the present disclosure is directed to a system for locating funding opportunities. The system may include at least one memory unit for storing instructions and at least one processor configured to execute the instructions to perform operations. The operations may include receiving a plurality of answers to queries presented to a user at an electronic interface, the answers comprising financial information; predicting, based on the financial information, a funding opportunity and a success rate for establishing a business, the funding opportunity and the success rate being determined based on a plurality of supervised learning techniques; searching the Internet to identify data relating to real-time funding announcements; comparing the data to the funding opportunity and the success rate; assigning a ranking value to the funding opportunity, the ranking value being based on the data comparison and being associated with a plurality of rules; and calculating, based on the rules, an estimated timeline for financing the funding opportunity.

Another aspect of the present disclosure is directed to a computer-implemented method for locating funding opportunities. The method may include receiving a plurality of answers to queries presented to a user at an electronic interface, the answers comprising financial information; predicting, based on the financial information, a funding opportunity and a success rate for establishing a business, the funding opportunity and the success rate being determined based on a plurality of supervised learning techniques; searching the Internet to identify data relating to real-time funding announcements; comparing the data to the funding opportunity and the success rate; assigning a ranking value to the funding opportunity, the ranking value being based on the data comparison and being associated with a plurality of rules; and calculating, based on the rules, an estimated timeline for financing the funding opportunity.

Yet another aspect of the present disclosure is directed to non-transitory computer-readable medium storing instructions that, when executed by a processor, cause the processor to perform operations. The operations may include receiving a plurality of answers to queries presented to a user at an electronic interface, the answers comprising financial information; predicting, based on the financial information, a funding opportunity and a success rate for establishing a business, the funding opportunity and the success rate being determined based on a plurality of supervised learning techniques; searching the Internet to identify data relating to real-time funding announcements; comparing the data to the funding opportunity and the success rate; assigning a ranking value to the funding opportunity, the ranking value being based on the data comparison and being associated with a plurality of rules; and calculating, based on the rules, an estimated timeline for financing the funding opportunity.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The disclosure is generally directed to directed to a system for locating funding opportunities including predicting a funding opportunity and a success rate for establishing a business. Reference will now be made in detail to the disclosed embodiments, examples of which are illustrated in the accompanying drawings.

Figure 1:
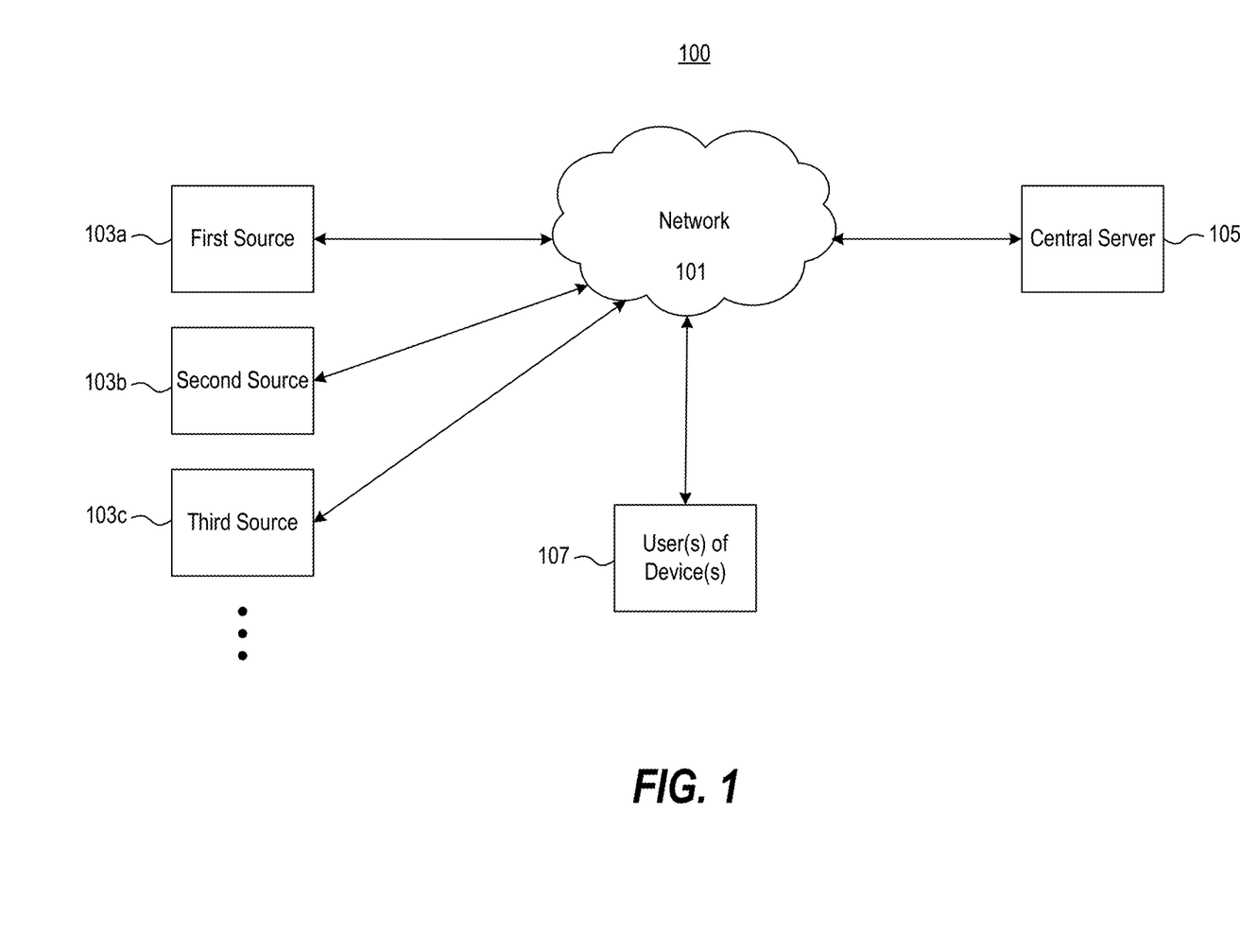
FIG. 1 depicts an exemplary system for locating funding opportunities, consistent with disclosed embodiments of the present disclosure.

FIG. 1 shows a system 100 consistent with the embodiments disclosed herein. As depicted in FIG. 1, system 100 may comprise a network 101, a plurality of sources, e.g., source 103a, 103b, and 103c, a central server 105, and user(s) of device(s) 107. One skilled in the art could vary the structure and/or components of system 100. For example, system 100 may include additional servers 105 and/or one or more sources may be stored on a server. By way of further example, one or more sources may be distributed over a plurality of servers, and/or one or more sources may be stored on the same server.

Network 101 may be any type of network that provides communication and/or facilitates the exchange of information between two or more nodes/terminals. For example, network 101 may comprise the Internet, a Local Area Network (LAN), or other suitable telecommunications network. In some embodiments, one or more nodes of system 100 may communicate with one or more additional nodes via a dedicated communications medium.

Figure 2:
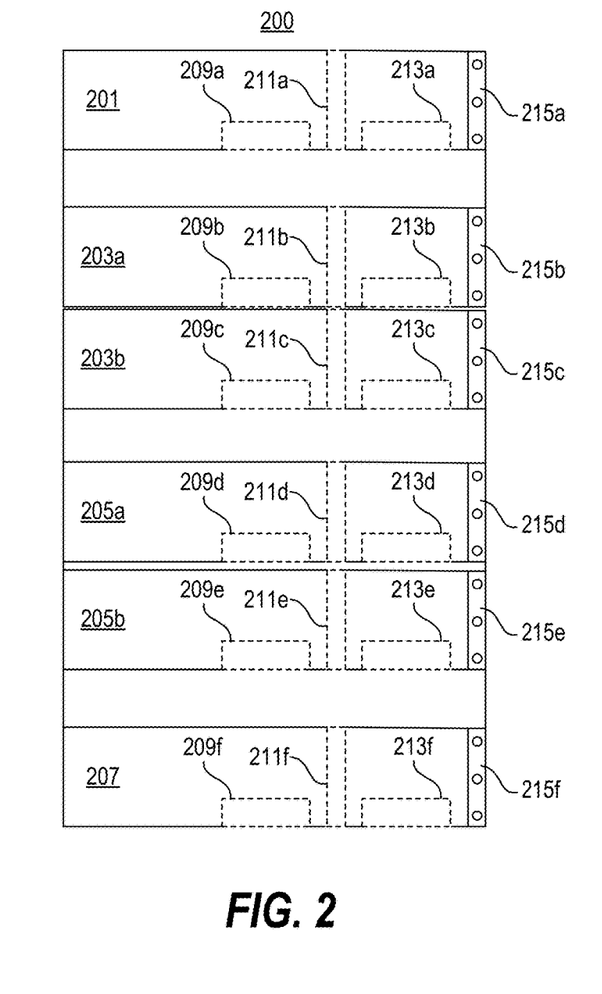
FIG. 2 depicts a server rack for use in the system of FIG. 1, consistent with disclosed embodiments.

As noted above, central server 105 may comprise a single server or a plurality of servers. In some embodiments, the servers may be connected to form one or more server racks, e.g., as depicted in FIG. 2. In some embodiments, central server 105 may store instructions to perform one or more operations of the disclosed embodiments. Central server 105 may further comprise one or more processors (e.g., CPUs, GPUs) for performing stored instructions. In some embodiments, central server 105 may send information to and/or receive information from user(s) of device(s) 107 through network 101.

In some embodiments, sources 103a, 103b, and 103c may comprise one or more databases. As used herein, a "database" may refer to a tangible storage device, e.g., a hard disk, used as a database, or to an intangible storage unit, e.g., an electronic database. For example, a local database may store information related to particular locale. A locale may comprise an area delineated by natural barriers (e.g., an island), an area delineated by artificial barriers (e.g., Washington, D.C.), or an area delineated by a combination thereof (e.g., the United Kingdom). Thus, the website of any governmental or municipal body may comprise a local database.

In other embodiments, sources 103a, 103b, and 103c may personal or public news databases, e.g., the website of the Washington Post or the Wall Street Journal RSS feed. As used herein, the term "news" is not limited to information from traditional media companies but may include announcement information from blogs (e.g., financial blogs), websites (e.g., Bloomberg, LLP or a company's website and/or institutional venture capital or federal grant website), or the like.

In still other embodiments, sources 103a, 103b, and 103c may comprise other databases. For example, sources 103a, 103b, and 103c may comprise databases of addresses, phone numbers, and other contact information. By way of further example, sources 103a, 103b, and 103c may comprise databases of social media activity (e.g., Facebook, Twitter, or Instagram). By way of further example, sources 103a, 103b, and 103c may comprise online encyclopedias or wikis.

Further, system 100 may include a plurality of different types of sources, e.g., source 103a may comprise a local database, source 103b may comprise a news database, and source 103c may comprise one of the other databases. In some embodiments, one or more sources may be updated on a rolling basis (e.g., an RSS feed may be updated whenever its creator updates the feed's source) or on a periodic basis (e.g., the website of a town newspaper may be updated once per day). In certain aspects, one or more sources may be operably connected together (e.g., sources 103b and 103c) and/or one or more sources may be operably independent (like source 103a).

In some embodiments, central server 105 may receive information from sources 103a, 103b, and 103c. For example, central server 105 may use one or more known data aggregation techniques in order to retrieve information from sources 103a, 103b, and 103c.

In some embodiments, network 101 may comprise, at least in part, the Internet, and central server 105 may perform searching or may perform scraping to receive information from sources 103a, 103b, and 103c. As used herein, "searching" may include searching by keyword, alphanumeric string, or by URL or web address, according to any method, including, for example, scraping. As used herein, "scraping" or "scraping the Internet" may include any manner of data aggregation, by machine or manual effort, including but not limited to "crawling" across websites, identifying links and changes to websites, data transfer through API's, FTP's, GUI, direct database connections through, e.g., using SQL, parsing, and extraction of website pages, or any other suitable form of data acquisition. In certain aspects, central server 105 may execute one or more applications configured to function as web scrapers. A web scraper may comprise a web crawler and an extraction bot. A web crawler may be configured to find, index, and/or fetch web pages and documents. An extraction bot may be configured to copy the crawled data to central server 105 or may be configured to process the crawled data and copy the processed data to central server 105. For example, the bot may parse, search, reformat, etc., the crawled data before copying it.

Information scraped from sources 103a, 103b, and 103c may comprise web pages (e.g., HTML documents) as well as other document types (e.g., pdf, txt, rtf, doc, docx, ppt, pptx, opt, png, tiff, png, jpeg, etc.). Twitter, Facebook, Instagram, and other social media pages may be scraped. The web scraper may be configured to modify one or more types of scraped data (e.g., HTML) to one or more other types of scraped data (e.g., txt) before copying it to central server 105.

The web scraper may run continuously, near continuously, periodically at scheduled collection intervals (e.g., every hour, every two hours, etc.), or on-demand based on a request (e.g., user(s) of device(s) 107 may send a request to central server 105 that initiates a scraping session). In some embodiments, the web scraper may run at different intervals for different sources. For example, the web scraper may run every hour for source 103a and run every two hours for source 103b. This may allow the web scraper to account for varying excess traffic limits and/or to account for varying bandwidth limits that may result in suboptimal performance or crashes of a source.

In some embodiments, manual operators may supplement the processes performed by the web scraper. For example, a manual operator may assist with indexing web pages that employ anti-crawling technology. By way of further example, a manual operator may assist with parsing data that the extraction bot cannot interpret.

User(s) of device(s) 107 may connect to network 101 by using one or more devices with an operable connection to network 101. For example, user(s) of device(s) 107 may connect to network 101 using one or more devices of FIG. 3 or 4 (described below). In some embodiments, user(s) of device(s) 107 may send information to and receive information from central server 105 though network 101.

In some embodiments, user(s) of device(s) 107 may send proprietary information to central server 105 via network 101. For example, proprietary information may comprise information privy to user(s) of device(s) 107 including answers to sample queries. Such queries may inquire as to whether a user is part of a LLC or a sole proprietor. Other inquiries may ask how much capital or debt a user has, and how much funding a user requires for his or her business. As another example, other priority information may include what type of business the user operates and whether or not it is minority or woman owned. Other types of proprietary information are contemplated. For example, proprietary information may further include financial results of a quarterly private or public earnings meeting between user(s) of device(s) 107 and other persons, or non-public organizational actions. By way of further example, proprietary information may comprise information obtained by user(s) of device(s) 107 from a subscription news service or other service requiring payment in exchange for information. By way of further example, proprietary information may comprise information generated by the user, such as through their own efforts or by a collective group of, e.g., an organization. Accordingly, proprietary information may be described as information determined through "proprietary research." Moreover, in some embodiments, proprietary information may be considered to be non-scraped, and in other embodiments, proprietary information may be scraped from a resource (e.g., from a server).

FIG. 2 shows a server rack 200 for use in system 100 of FIG. 1. As depicted in FIG. 2, server rack 200 may comprise a management/control server 201, one or more processing servers, e.g., servers 203a and 203b, one or more storage servers, e.g., servers 205a and 205b, and spare server 207. The number and arrangement of the servers shown in FIG. 2 is an example, and one of skill in the art will recognize any appropriate number and arrangement is consistent with the disclosed embodiments.

In some embodiments, one or more servers of server rack 200 may comprise one or more volatile memories. For example, as depicted in FIG. 2, management/control server 201 comprises volatile memory 209a, compute server 203a comprises volatile memory 209b, compute server 203b comprises volatile memory 209c, storage server 205a comprises volatile memory 209d, storage server 205b comprises volatile memory 209e, and spare server 207 comprises volatile memory 209f. A volatile memory may comprise a traditional RAM, e.g., SRAM or DRAM, or other suitable computer data storage. The memories may store instructions to perform operations of the disclosed embodiments. In addition, the memories may store information scraped from the Internet.

In some embodiments, one or more servers of server rack 200 may further comprise one or more processors. For example, as depicted in FIG. 2, management/control server 201 comprises processor 211a, compute server 203a comprises processor 211b, compute server 203b comprises processor 211c, storage server 205a comprises processor 211d, storage server 205b comprises processor 211e, and spare server 207 comprises processor 211f. A processor may comprise a traditional CPU, e.g., an Intel™, AMD™, or Sun™. CPU, a traditional GPU, e.g., an NVIDIA™ or ATI™ GPU, or other suitable processing device. In some embodiments, the processors may be operably connected to the memories.

In some embodiments, one or more servers of server rack 200 may further comprise one or more non-volatile memories. For example, as depicted in FIG. 2, management/control server 201 comprises non-volatile memory 213a, compute server 203a comprises non-volatile memory 213b, compute server 203b comprises non-volatile memory 213c, storage server 205a comprises non-volatile memory 213d, storage server 205b comprises non-volatile memory 213e, and spare server 207 comprises non-volatile memory 213f. A non-volatile memory may comprise a traditional disk drive, e.g., a hard disk drive or DVD drive, an NVRAM, e.g., flash memory, or other suitable non-volatile computer data storage. The non-volatile memories may store instructions to perform operations of the disclosed embodiments. In addition, the non-volatile memories may store information scraped from the Internet.

In some embodiments, one or more servers of server rack 200 may further comprise one or more network interfaces. For example, as depicted in FIG. 2, management/control server 201 comprises network interface 215a, compute server 203a comprises network interface 215b, compute server 203b comprises network interface 215c, storage server 205a comprises network interface 215d, storage server 205b comprises network interface 215e, and spare server 207 comprises network interface 215f. A network interface may comprise, for example, a network interface card (NIC) configured to use a known data link layer standard, such as Ethernet, Wi-Fi, Fibre Channel, or Token Ring. In some embodiments, the network interfaces may permit the servers to execute instructions remotely. In addition, the network interfaces may permit the to access information from the sources.

Server rack 200 need not include all components depicted in FIG. 2. Additionally, server rack 200 may include additional components not depicted in FIG. 2 (e.g., a backup server or a landing server).

Figure 3:
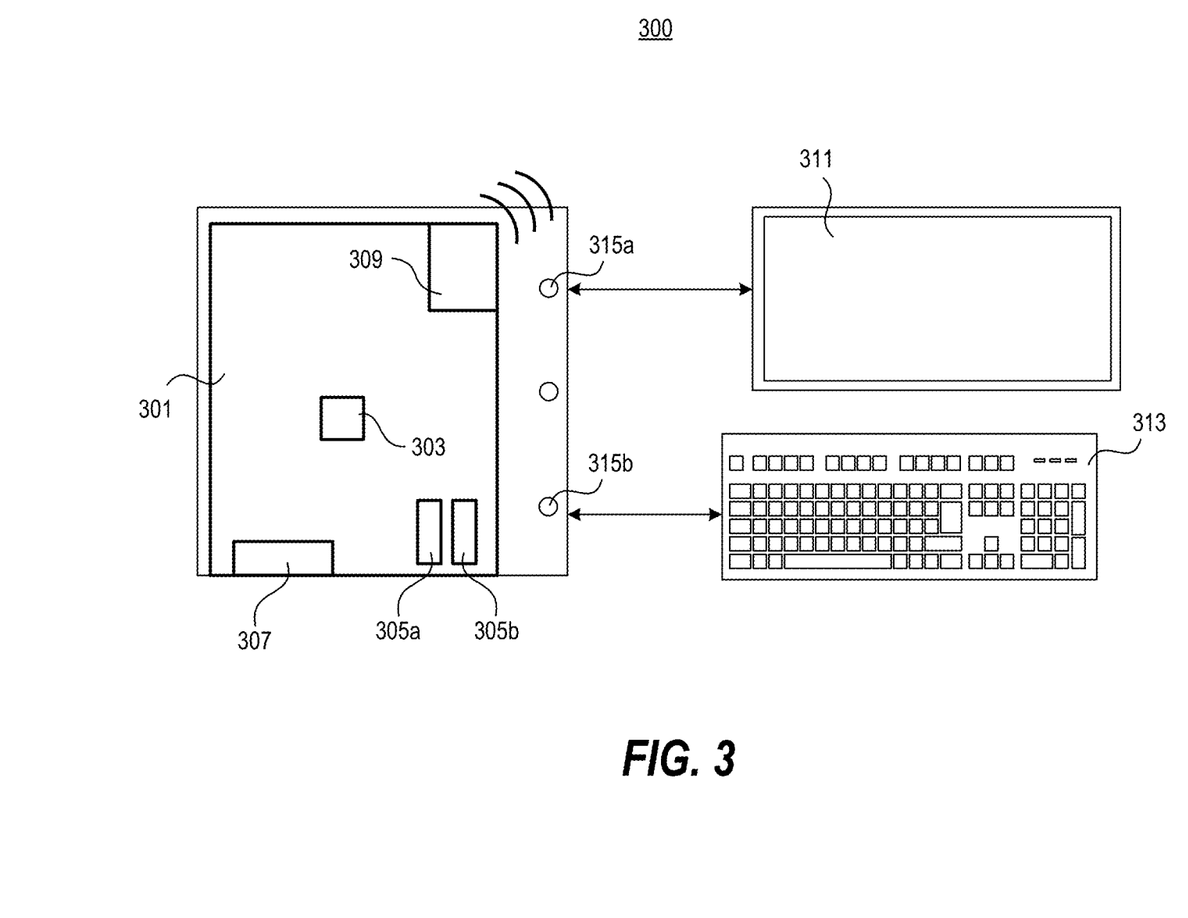
FIG. 3 depicts a device for use by the user(s) of the system of FIG. 1, consistent with disclosed embodiments.

FIG. 3 shows of an example of a device 300 for use by user(s) of device(s) 107 of system 100 of FIG. 1. For example, device 300 may comprise a desktop or laptop computer. As depicted in FIG. 3, device 300 may comprise a motherboard 301 having a processor 303, one or more memories (e.g., memories 305a and 305b, a non-volatile memory 307, and a network interface 309). As further depicted in FIG. 3, network interface 309 may comprise a wireless interface (e.g., an NIC configured to utilize Wi-Fi, Bluetooth, 4G, etc.). In other embodiments, network interface 309 may comprise a wired interface (e.g., an NIC configured to use Ethernet, Token Ring, etc.). In some embodiments, network interface 309 may permit device 300 to send information to and receive information from a network.

In some embodiments, device 300 may further comprise one or more display modules (e.g., display 311). For example, display 311 may comprise an LCD screen, an LED screen, or any other screen capable of displaying text and/or graphic content to the user. In some embodiments, display 311 may comprise a touchscreen that uses any suitable sensing technology (e.g., resistive, capacitive, infrared, etc.). In such embodiments, display 311 may function as an input device in addition to an output module.

In some embodiments, device 300 may further comprise one or more user input devices (e.g., keyboard 313 and/or a mouse (not shown)). As further depicted in FIG. 3, the display modules and user input devices may be operably connected to motherboard 301 using hardware ports (e.g., ports 315a and 315b). For example, a hardware port may comprise a PS/2 port, a DVI port, an eSata port, a VGI port, an HDMI port, a USB port, or the like.

Device 300 need not include all components depicted in FIG. 3. Additionally, device 300 may include additional components not depicted in FIG. 3 (e.g., external disc drives, graphics cards, etc.).

Figure 4A:
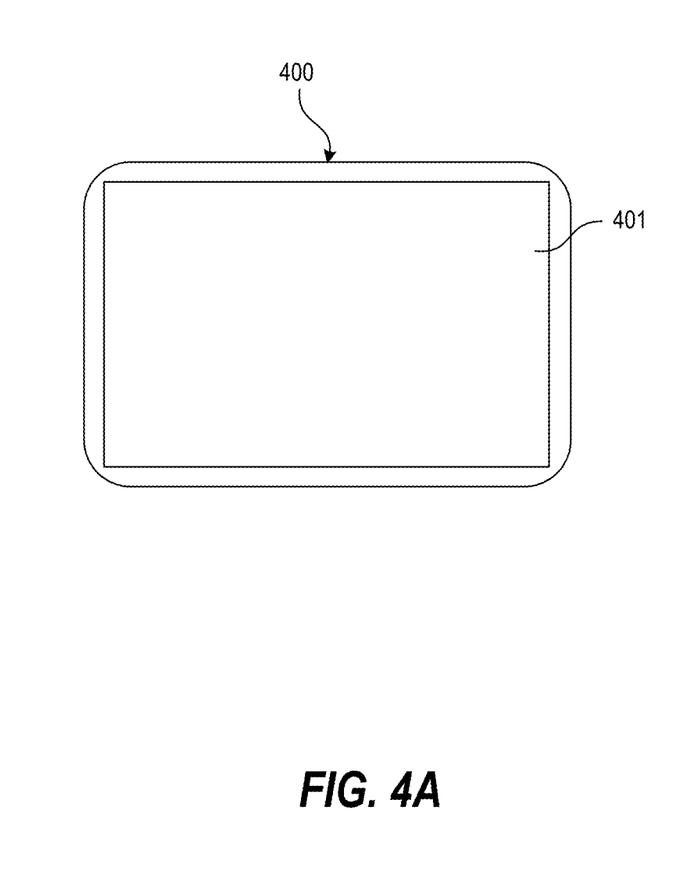
FIGS. 4A-4B depict multiple views of another device for use by the user(s) of the system of FIG. 1, consistent with disclosed embodiments.

FIG. 4A shows a device 400 for use by user(s) of device(s) 107 of system 100 of FIG. 1. For example, device 400 may comprise a tablet (e.g., an iPad or Microsoft Surface), or a cell phone (e.g., an iPhone or an Android smartphone). As depicted in FIG. 4A, device 400 may comprise screen 401. For example, screen 401 may comprise an LCD touchscreen, an LED touchscreen, or any other screen capable of receiving input from the user and displaying text and/or graphic content to the user.

Figure 4B:
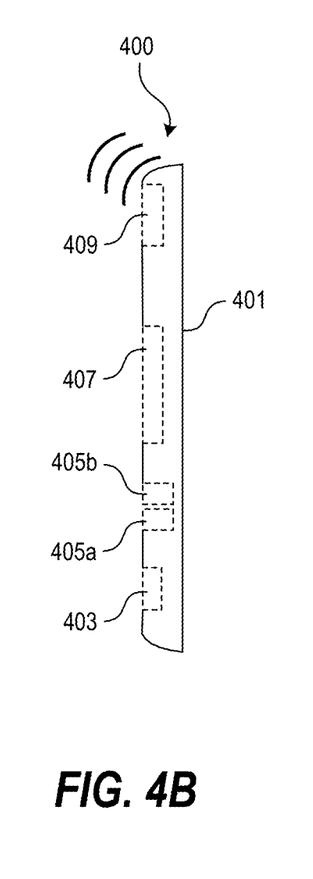

FIG. 4B is a side view of device 400 that depicts example hardware included within device 400. As depicted in FIG. 4B, device 400 may comprise a processor 403, one or more memories (e.g., memories 405a and 405b), a non-volatile memory 407, and a network interface 409. As further depicted in FIG. 4, network interface 409 may comprise a wireless interface, e.g., an NIC configured to use Wi-Fi, Bluetooth, 4G, or the like. In some embodiments, network interface 409 may permit device 400 to send information to and receive information from a network.

Device 400 need not include all components depicted in FIG. 4. Additionally, device 400 may include additional components not depicted in FIG. 4 (e.g., external hardware ports, graphics cards, etc.).

Figure 5:
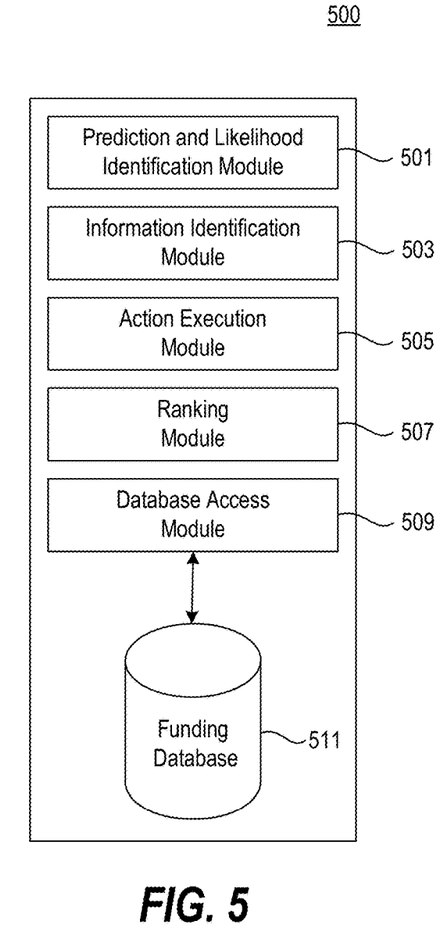
FIG. 5 depicts exemplary modules for locating funding opportunities, consistent with disclosed embodiments.

FIG. 5 is a depiction of a memory 500 storing program modules and data for predicting, based on the financial information, a funding opportunity, and a success rate for establishing a business. The funding opportunity and the success rate may be determined based on a plurality of supervised learning techniques (discussed below). In some embodiments, memory 500 may be included in, for example, central server 105, discussed above. Further, in other embodiments, the components of memory 500 may be distributed over more than one location (e.g., stored in a plurality of servers in communication with, for example, network 101).

As depicted in FIG. 5, memory 500 may include a prediction and likelihood identification module 501. Prediction and likelihood identification module 501 may generate and/or apply one or more predictive models. For example, prediction and likelihood identification module 501 may receive information from funding database 511 using information identification module 503 and use the received information as the input for the predictive models. After executing the models, prediction and likelihood identification module 501 may output one or more predictions and/or one or more likelihoods related to accessing capital or funding and/or the success rate of a business.

Memory 500 may also include an information identification module 503. Information identification module 503 may associate one or more identities with information received from funding database 511. For example, information identification module 503 may associate an identity of a user with a funding announcement or news story received from database 511 via sources 103a, 103b, or 103c. By way of further example, information identification module 503 may associate an identity of a user with a financial report received from funding database 511.

As depicted in FIG. 5, memory 500 may further include an action execution module 505. Action execution module 505 may manage one or more execution lists executed on one or more processors (not shown) operably connected to memory 500. For example, action execution module 505 may permit multi-threading in order to increase the efficiency with which the execution lists are executed.

As depicted in FIG. 5, memory 500 may further include a ranking module 507. Ranking module 507 may compare user(s) of device(s) 107 or funding data from funding database 511 to a current funding opportunity and a success rate, and may assign a ranking value to a funding opportunity. Ranking module 507 may assign the ranking value based on data comparison and a plurality of instructions. The ranking may be numerical in nature and ranking module 507 may be configured to adjust a ranking value of a funding opportunity in real-time.

As further depicted in FIG. 5, memory 500 may include a database access module 509. Database access module 509 may control access to the information stored in funding database 511. For example, database access module 509 may require one or more credentials from a user or another application in order to receive information from funding database 511.

As further depicted in FIG. 5, memory 500 may include a funding database 511. Funding database 511 may store funding information obtained from sources 103a-103c, such as public records, federal databases, news, angel investor networks, bank or financial institutions, and other predictive models. This data may be aggregated from a plurality of sources and/or parsed via machine analysis. For example, funding database 511 may store information related to one or more predicted or future events and indexed by user(s) of device(s) 107.

Figure 6:
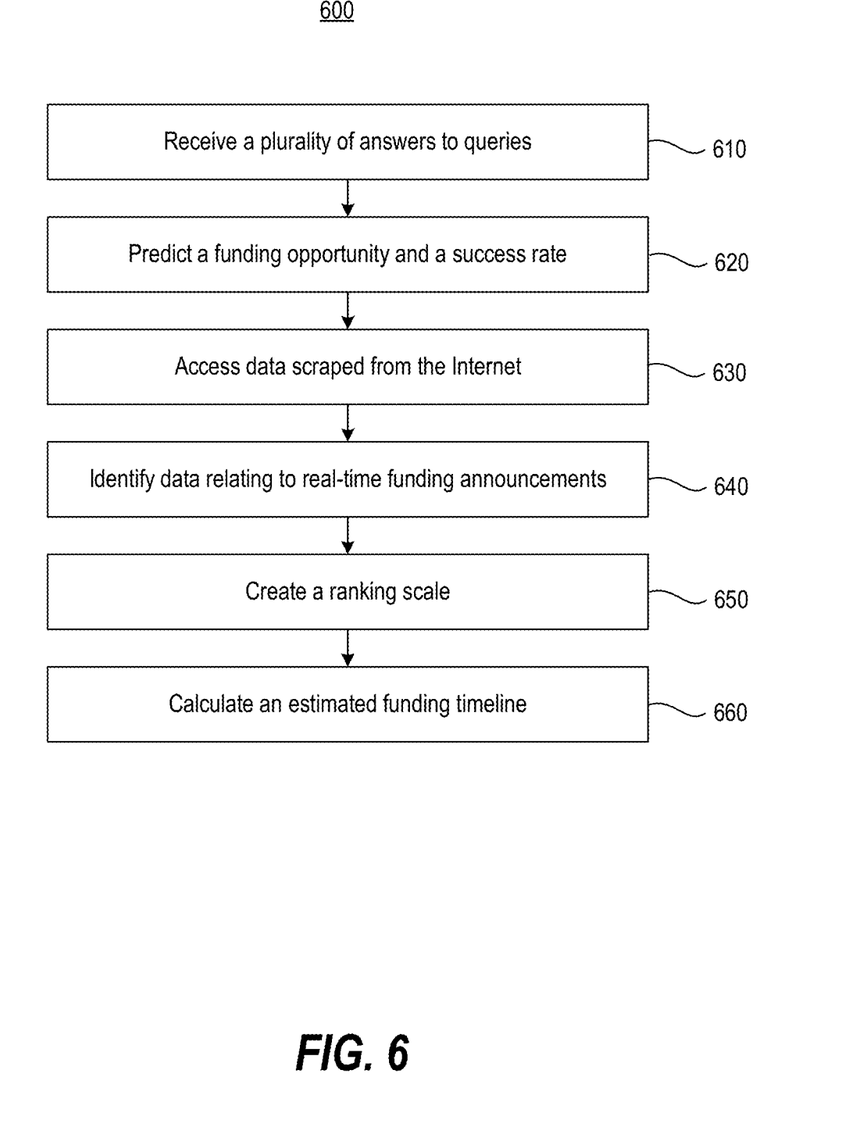
FIG. 6 depicts an exemplary process for locating funding opportunities, consistent with disclosed embodiments.

FIG. 6 is a flowchart of an exemplary method 600 for locating funding opportunities, consistent with disclosed embodiments. Method 600 may, for example, be executed by one or more processors of a server (e.g., central server 105 of FIG. 1) or any other appropriate hardware and/or software. Further, when executing method 600, the processors may execute instructions stored in one or more of the modules discussed above in connection with FIG. 5.

At step 610, server 105 may receive a plurality of answers to queries presented to a user at an electronic interface of device 107. The queries may be associated with at least one of the user's business, funding history, funding needs, industry, or location. The answers may include textual or alphanumeric financial or proprietary information (as discussed above). For example, proprietary information may comprise information privy to user(s) of device(s) 107 including answers to sample queries. Such queries may inquire as to whether a user is part of a LLC or a sole proprietor. Other inquiries may ask how much capital or debt a user has, and how much funding a user requires for his or her business. Other types of proprietary information and query answers are contemplated. In other embodiments, server may automatically receive proprietary information 105 obtained through automated scraping of at least one proprietary data source. In some embodiments, sever 105 may store the received proprietary information. For example, the proprietary information may be stored in funding database 511 or in a separate database. In some embodiments, system 100 may use the received proprietary information without storing it.

These answers to queries may be entered as information or a user input into device 400. As depicted in FIG. 4A, device 400 may comprise screen 401. For example, screen 401 may comprise an LCD touchscreen, an LED touchscreen, or any other screen capable of receiving input from the user(s) of device(s) 107 and receiving text and/or graphic or other financial content or electronic files from user(s) of device(s) 107.

At step 620, server 105 may predict, based on financial information received as answers to queries, a funding opportunity and a success rate for establishing a business. The funding opportunity and the success rate may be determined based on a plurality of supervised learning techniques. The supervised learning techniques may comprise at least one of classification techniques, regression techniques, SimpleLogistics, Naive Bayes, or RandomForest. In some embodiments, server 105 may analyze financial information from at least one of Crunchbase, Forbes, or NAICS codes. Server 105 may then predict the funding opportunity and the success rate based on the financial information analysis.

In some embodiments, server 105 may predict the funding opportunity and success rate, at least in part, via a query answer from a user. For example, server 105 may receive a query from a user via a data input terminal. The data input terminal may comprise device 400 associated with the user, e.g., a cell phone, a tablet, or other personal computing device. For example, user(s) of device(s) 107 may input the number of a publicly accessible institutional financial or bank account, and server 105 may predict a funding opportunity as the outcome of sourcing an amount of funds located in the financial or bank account. Similarly, the user may input information related to a pending business or regulatory rule, and server 105 may identify a business success rate based on the enactment or non-enactment of a pending business or regulatory rule. By way of further example, the user may input the number of a pending court case, and server 105 may identify a success rate of a business based on a prediction as to which party the jury will find in favor of, and based on any anticipated fines or legal fees that a business may or may not be liable for paying.

At step 630, server 105 may search the Internet. As used herein, "searching" may include searching by keyword, alphanumeric string, or by URL or web address, according to any method. In some embodiments, server 105 may receive an answer to a query before searching or accessing scraped data or before storing the data. For example, server 105 may determine, at least in part, which scraped data to access based on the query answer. Server 105 may determine which scraped data to access based on preexisting tags in the data and/or based on a dynamic determination of relevance. For example, if the user query answer included "debt," the server may determine which scraped data to access based on whether the data was tagged as related to "debt." Server 105 may implement one or more techniques for scraping data from the Internet as described above. In some embodiments, the server may access data from a separate web scraper. In other embodiments, federal funding data may be scraped from Grants.gov, Small Business Innovation Research and Technology Transfer Programs, Economic Development Administration, Women's Business Centers and similar funding websites.

In some embodiments, server 105 may store the scraped data. For example, the server may store the scraped data in a database (e.g., funding database 511). In some embodiments, the server may parse the data prior to storing it and/or associated one or more identities with the data prior to storing it. For example, the server may remove one or more formatting tags from a scraped HTML documents before storing the document. By way of a further example, the server may associate a scraped document with one or more users and/or one or more businesses before storing it. In some embodiments, the server may receive previously scraped and stored data from one or more databases in lieu of accessing scraped data and storing it. In some embodiments, server 105 may access data from at least one of a Twitter Firehose API or a Twitter Search API.

At step 640, server 105 may identify data relating to real-time funding announcements. For example, the server may apply one or more models with some or all of the scraped data as one or more inputs. Instead of using raw scraped data, the server may extract one or more features from the data, as discussed above, to use as inputs for the model.

At step 650, server 105 may create a ranking scale to assess the value of the funding announcements to user(s) of device(s) 107. For example, ranking module 507 may compare user(s) of device(s) 107 or funding data from funding database 511 to a current funding opportunity and a success rate, and may assign a ranking value to a funding opportunity. Ranking module 507 may assign the ranking value based on data comparison and a plurality of instructions. The comparison may further compare to real-time funding mentions in the user's industry and location. The ranking may be numerical in nature and ranking module 507 may be configured to adjust a ranking value of a funding opportunity in real-time. In some embodiments, server 105 may use the same model(s) that determined the funding opportunity and business success rate predictions to determine one or more ranking values. In other embodiments, server 105 may use one or more different models, either separately or in combination with the model(s) used to determine the funding and success predictions, to determine the ranking. As an example, if a business is ranked an overall 2 (low ranking), the final results lean towards providing advice on building a successful business infrastructure: "There are four upcoming informational startup events in your area." If the business is ranked an overall 5 (high ranking), the final results are focused on actively securing funds: "You qualify for eight federal grants, start applying today."

In some embodiments, the server may perform steps 620, 630, 640, and 650 nearly simultaneously. For example, server 105 may use one or more models that generate initial predictions and access and identify data in conjunction with creating a ranking scale. Server 105 may transmit the initial predictions and ranking values to one or more devices. For example, the server may transmit the initial predictions and ranking values to a device associated with a user, e.g., a cell phone, a tablet, or other personal computing device.

Figure 9:
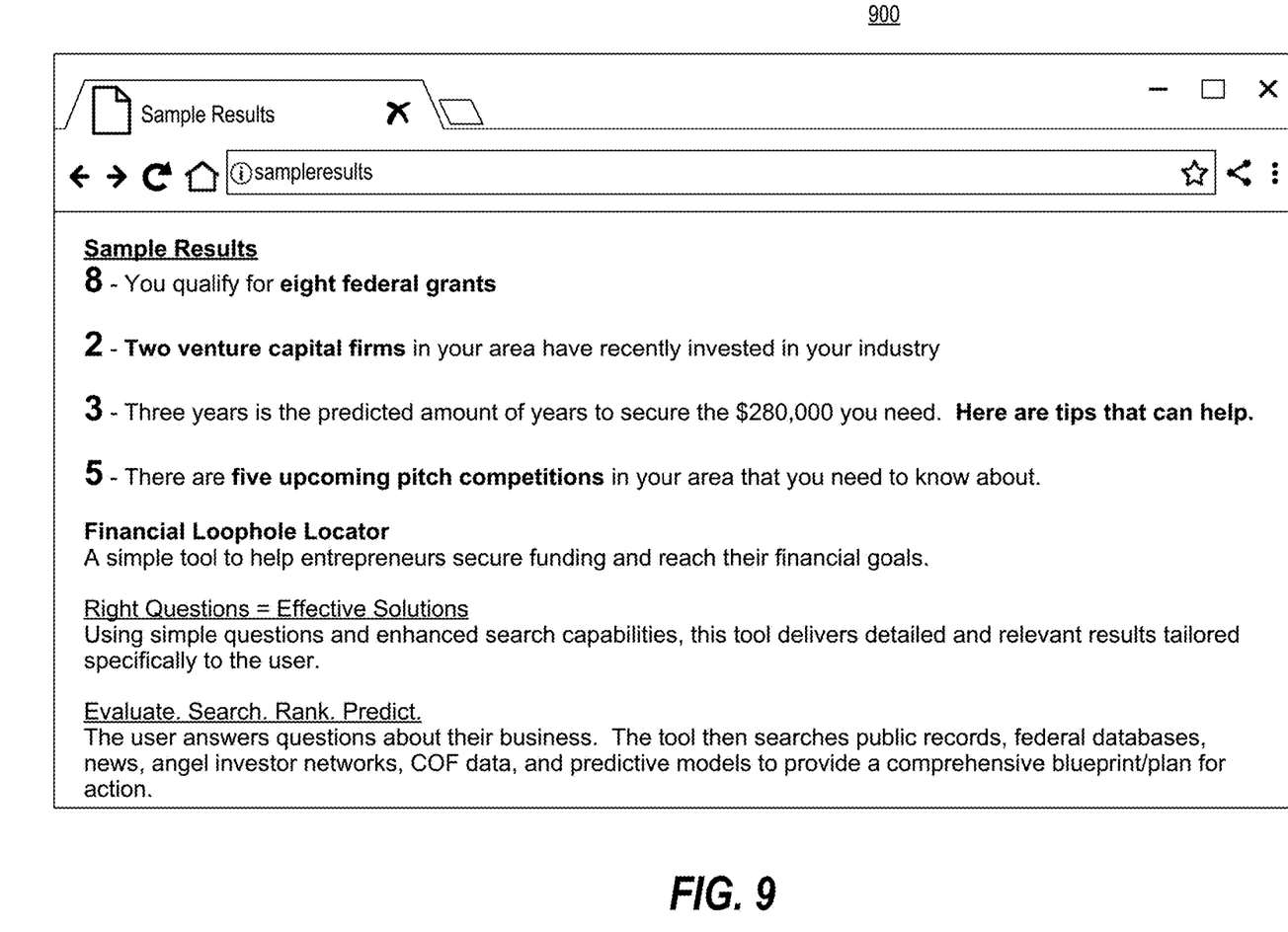
FIG. 9 depicts an example of a sample webpage including exemplary results, consistent with disclosed embodiments.

At step 660, server 105 may calculate, based on processor instructions and based on the scraped information and the proprietary information, an estimated timeline for financing the funding opportunity. In some embodiments, server 105 may use the same model(s) that determined the funding opportunity and business success rate predictions to calculate an estimated timeline for financing a funding opportunity. In other embodiments, server 105 may use one or more different models, including predictive models, either separately or in combination with the model(s) used to determine the funding and success predictions, to calculate an estimated funding timeline. Server 105 may transmit the calculated estimated funding timeline to one or more devices. For example, server 105 may transmit funding timeline to device 107 associated with a user, e.g., a cell phone, a tablet, a smart watch, or other personal computing device. Server 105 may transmit the funding timeline to a device 107 associated with the user that inputted the proprietary information as answers to queries and/or a user different from the user that inputted the proprietary information. Server 105 may communicate the funding timeline or other model based results in an electronic message to the user and display them at an electronic interface. As an example, and as shown in FIG. 9, server 105 may display "Three years is the predicted amount of time to secure the $280,000 you need."

Systems and methods consistent with the present disclosure may calculate funding timelines, predict funding opportunities and business success rates, and create ranking values based on real-time funding announcements for a plurality of users. One or more subsets of the users may prefer to share some or all calculations, predictions, rankings, proprietary information, and the like. Other subsets of the users may prefer to keep private some of all of the calculations, predictions, rankings, proprietary information, and the like. Systems and methods consistent with the present disclosure may allow for subsets of users to select and enforce such desired privacy settings. Server 105 may also provide tips, scenarios and challenges to help avoid delays in funding and stay on a track in securing the total funds needed.

Figure 7:
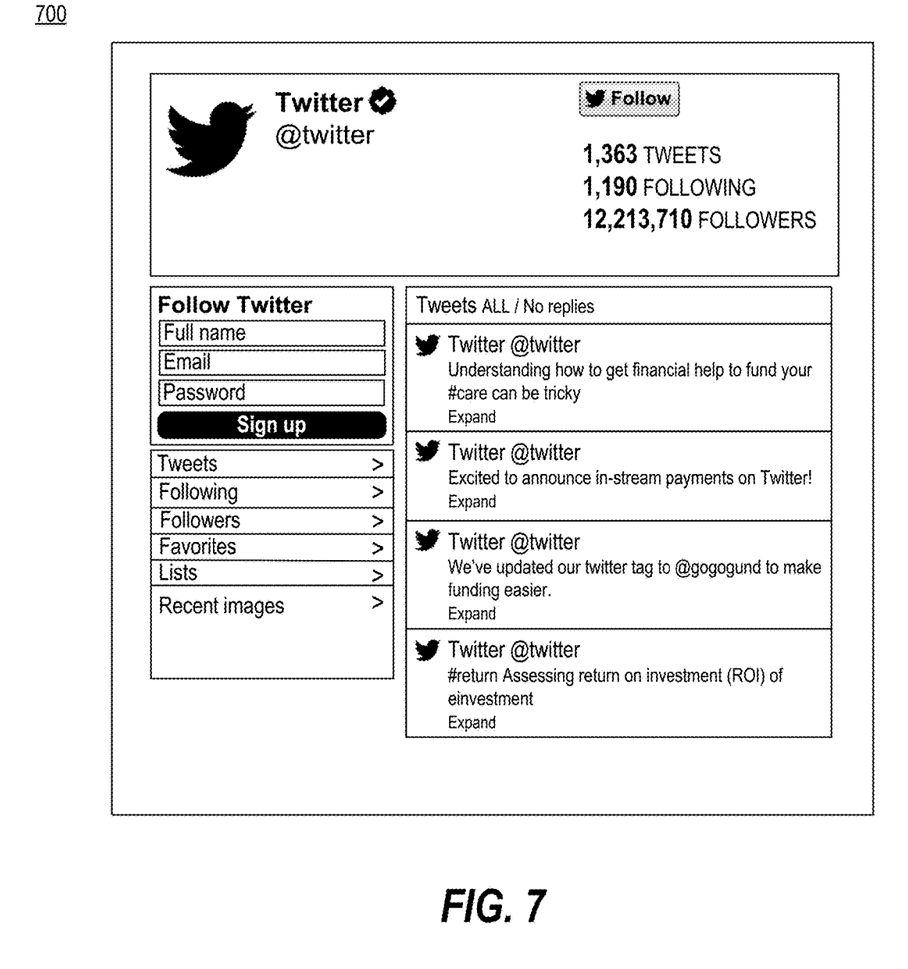
FIG. 7 depicts an example of a Twitter webpage used for accessing funding pronouncements, consistent with disclosed embodiments.

FIG. 7 depicts an example of a sample Twitter webpage 700 used for accessing funding pronouncements, consistent with disclosed embodiments. Server 105 may specifically target tweets regarding funding announcements from Venture Capital firms, startups, investors and influencers. As an example, network 101 may comprise, at least in part, the Internet, and central server 105 may perform searching or may perform scraping of a Twitter webpage 700 to receive information. Server 105 may searching by keyword, alphanumeric string, or by URL or web address, according to any method, including, for example, scraping. Server 105 may crawl across Twitter webpage 700, identify links and changes to the webpage 700, parse and extract from webpage 700, or perform any other suitable form of data acquisition. In certain aspects, central server 105 may execute one or more applications configured to function as web scrapers. A web scraper may comprise a web crawler and an extraction bot. A web crawler may be configured to find, index, and/or fetch web pages and documents. An extraction bot may be configured to copy the crawled data to server 105 or may be configured to process the crawled data and copy the processed data to central server 105. By way of a further example, tweets as "understanding how to get financial help," "excited to announce in-stream payments on Twitter," "we've updated our twitter tag to @gogogund to make funding easier," and "#return Assessing return on investment (ROI)," may be scraped, extracted, and stored in funding database 511. In some embodiments, server 105 may access data from at least one of a Twitter Firehose API or a Twitter Search API.

Figure 8:
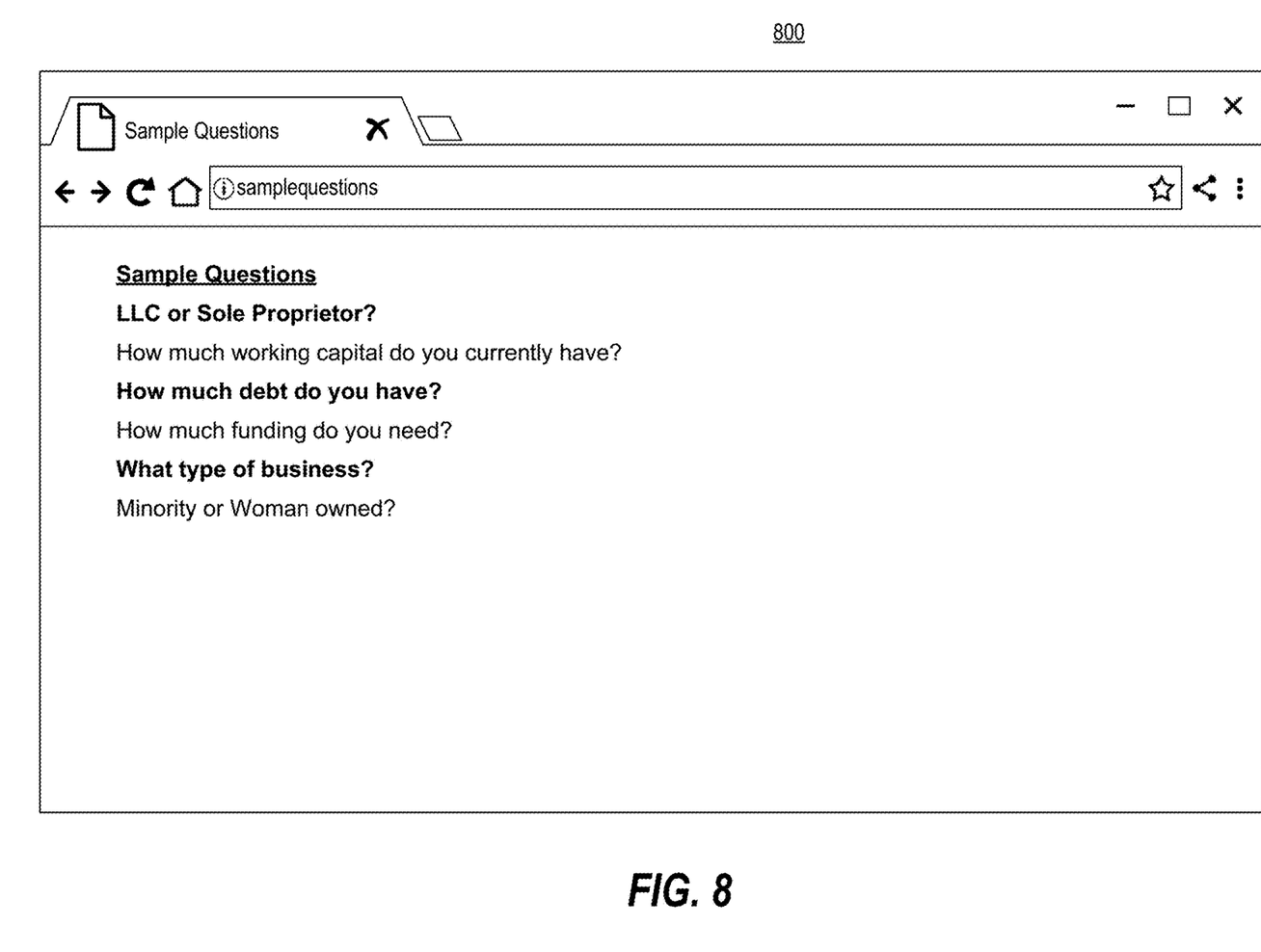
FIG. 8 depicts an example of a sample webpage including exemplary queries, consistent with disclosed embodiments.

FIG. 8 shows an example webpage 800 including exemplary queries, consistent with disclosed embodiments. In some embodiments, user(s) of device(s) 107 may send proprietary information to central server 105 via network 101. For example, proprietary information may comprise information privy to user(s) of device(s) 107 including answers to sample queries. As shown in FIG. 8, such queries may inquire as to whether a user is part of a LLC or a sole proprietor. Other inquiries may ask how much capital or debt a user has, and how much funding a user requires for his or her business. As another example, other queries may include what type of business the user operates and whether or not it is minority or woman owned. As shown in FIG. 8, each of the sample questions may include a hyperlink that, when clicked upon, opens up an HTML window to allow for entry and submission of user input answering the sample questions.

FIG. 9 depicts an example of a sample webpage 900 including exemplary sample results, consistent with disclosed embodiments. As discussed above, server 105 may use one or more models that generate initial predictions and access and identify data in conjunction with creating a ranking scale. Server 105 may then transmit the initial predictions. As shown in FIG. 9, sample prediction results relating to funding opportunities and timeline include "You qualify for eight federal grants," "Two venture capital firms in your area have recently invested in your industry," "Three years is the predicted amount of time to secure the $280,000 you need," and "There are five upcoming pitch competitions in your area that you need to know about." These results may be displayed to user(s) of device(s) 107 in webpage 900 and may include hyperlinks that, when clicked upon, opens up HTML windows to allow for entry and submission of user input relating to the sample results. In other embodiments, results may be communicated in an electronic message to the user and displayed at the electronic interface 900.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system for locating funding opportunities, the system comprising:
    at least one memory unit for storing instructions; and
    at least one processor configured to execute the instructions to perform operations comprising:
        receiving a plurality of answers to queries presented to a user at an electronic interface, the answers comprising financial information;
        predicting, based on the financial information, a funding opportunity and a success rate for establishing a business, the funding opportunity and the success rate being determined based on a plurality of supervised learning techniques;
        scraping, based on an identification of a change to a webpage, data from the webpage to identify data relating to real-time funding announcements, wherein scraping of the data comprises scraping at different time intervals based on a source of the webpage;
        comparing the data to the funding opportunity and the success rate;
        assigning a ranking value to the funding opportunity, the ranking value being based on the data comparison and being associated with a plurality of rules; and calculating, based on the rules, an estimated timeline for financing the funding opportunity.

2. The system of claim 1, wherein the queries are associated with at least one of the user's business, funding history, funding needs, industry, or location.

3. The system of claim 1, wherein the supervised learning techniques comprise at least one of classification techniques, regression techniques, Simplelogistics, Naive Bayes, or RandomForest.

4. The system of claim 1, wherein the operations further comprise:
    analyzing financial information from at least one of Crunchbase, Forbes, or NAICS codes; and
    predicting the funding opportunity and the success rate based on the financial information analysis.

5. The system of claim 1, wherein the operations further comprise accessing data from at least one of a Twitter Firehose API or a Twitter Search API.

6. The system of claim 1, wherein the rules comprise instructions communicated in an electronic message to the user and displayed at the electronic interface.

7. The system of claim 1, wherein the operations further comprise calculating an estimated timeline based on a predictive model.

8. The system of claim 1, wherein the change to the website comprises a change in an electronic link displayed on the webpage.

9. A computer-implemented method for locating funding opportunities, comprising:
- receiving a plurality of answers to queries presented to a user at an electronic interface, the answers comprising financial information;
- predicting, based on the financial information, a funding opportunity and a success rate for establishing a business, the funding opportunity and the success rate being determined based on a plurality of supervised learning techniques;
- scraping, based on an identification of a change to a webpage, data from the webpage to identify data relating to real-time funding announcements, wherein scraping of the data comprises scraping at different time intervals based on a source of the webpage;
- comparing the data to the funding opportunity and the success rate;
- assigning a ranking value to the funding opportunity, the ranking value being based on the data comparison and being associated with a plurality of rules; and
- calculating, based on the rules, an estimated timeline for financing the funding opportunity.

10. The computer-implemented method of claim 9, wherein the queries are associated with at least one of the user's business, funding history, funding needs, industry, or location.

11. The computer-implemented method of claim 9, wherein the supervised learning techniques comprise at least one of classification techniques, regression techniques, Simplelogistics, Naive Bayes, or RandomForest.

12. The computer-implemented method of claim 9, the method further comprising:
- analyzing financial information from at least one of Crunchbase, Forbes, or NAICs codes; and
- predicting the funding opportunity and the success rate based on the financial information analysis.

13. The computer-implemented method of claim 9, the method further comprising accessing data from at least one of a Twitter Firehose API or a Twitter Search API.

14. The computer-implemented method of claim 9, the method further comprising communicating the rules in an electronic message to the user for display at the electronic interface.

15. The computer-implemented method of claim 9, the method further comprising calculating an estimated timeline based on a predictive model.

16. The method of claim 9, wherein the change to the website comprises a change in an electronic link displayed on the webpage.

17. A non-transitory computer-readable medium storing instructions that, when executed by a processor, cause the processor to perform operations comprising:
- receiving a plurality of answers to queries presented to a user at an electronic interface, the answers comprising financial information;
- predicting, based on the financial information, a funding opportunity and a success rate for establishing a business, the funding opportunity and the success rate being determined based on a plurality of supervised learning techniques;
- scraping, based on an identification of a change to a webpage, data from the webpage to identify data relating to real-time funding announcements, wherein scraping of the data comprises scraping at different time intervals based on a source of the webpage;
- comparing the data to the funding opportunity and the success rate;
- assigning a ranking value to the funding opportunity, the ranking value being based on the data comparison and being associated with a plurality of rules; and
- calculating, based on the rules, an estimated timeline for financing the funding opportunity.

18. The non-transitory computer-readable medium of claim 17, wherein the queries are associated with at least one of the user's business, funding history, funding needs, industry, or location.

19. The non-transitory computer-readable medium of claim 17, wherein the supervised learning techniques comprise at least one of classification techniques, regression techniques, Simplelogistics, Naive Bayes, or RandomForest.

20. The non-transitory computer-readable medium of claim 17, wherein the operations further comprise:
- analyzing financial information from at least one of Crunchbase, Forbes, or NAICs codes; and
- predicting the funding opportunity and the success rate based on the financial information.

21. The non-transitory computer-readable medium of claim 17, wherein the operations further comprise accessing data from at least one of a Twitter Firehose API or a Twitter Search API.

22. The non-transitory computer-readable medium of claim 17, wherein the operations further comprise communicating the rules in an electronic message to the user for display at the electronic interface.

23. The non-transitory computer-readable medium of claim 17, wherein the change to the website comprises a change in an electronic link displayed on the webpage.

* * * * *